United States Patent
Thakur et al.

(10) Patent No.: US 7,895,644 B1
(45) Date of Patent: Feb. 22, 2011

(54) METHOD AND APPARATUS FOR ACCESSING COMPUTERS IN A DISTRIBUTED COMPUTING ENVIRONMENT

(75) Inventors: Parag Thakur, Palo Alto, CA (US); Hay M. Tran, Union City, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1358 days.

(21) Appl. No.: 11/293,664

(22) Filed: Dec. 2, 2005

(51) Int. Cl.
   G06F 7/04 (2006.01)
   G06F 15/16 (2006.01)
(52) U.S. Cl. .......................................... 726/5; 709/229
(58) Field of Classification Search ............... 726/5; 709/229
   See application file for complete search history.

(56) References Cited

U.S. PATENT DOCUMENTS

| | | | | |
|---|---|---|---|---|
| 7,103,666 B2 * | 9/2006 | Royer et al. | | 709/227 |
| 7,540,020 B1 * | 5/2009 | Biswas et al. | | 726/6 |
| 7,610,390 B2 * | 10/2009 | Yared et al. | | 709/229 |
| 7,673,045 B1 * | 3/2010 | Battle et al. | | 709/225 |
| 2003/0158945 A1 * | 8/2003 | Liu | | 709/227 |
| 2004/0128393 A1 * | 7/2004 | Blakley et al. | | 709/229 |
| 2004/0158743 A1 * | 8/2004 | Ham et al. | | 713/201 |
| 2004/0225878 A1 * | 11/2004 | Costa-Requena et al. | | 713/150 |
| 2006/0021018 A1 * | 1/2006 | Hinton et al. | | 726/10 |
| 2006/0075224 A1 * | 4/2006 | Tao | | 713/164 |
| 2006/0136990 A1 * | 6/2006 | Hinton et al. | | 726/2 |
| 2006/0218625 A1 * | 9/2006 | Pearson et al. | | 726/4 |
| 2006/0218628 A1 * | 9/2006 | Hinton et al. | | 726/8 |
| 2006/0218629 A1 * | 9/2006 | Pearson et al. | | 726/8 |
| 2007/0039043 A1 * | 2/2007 | Garskof | | 726/8 |
| 2010/0071056 A1 * | 3/2010 | Cheng et al. | | 726/16 |

* cited by examiner

Primary Examiner—Techane J Gergiso
(74) Attorney, Agent, or Firm—Campbell Stephenson LLP

(57) ABSTRACT

A method and apparatus for single sign-out from one or more application servers in a distributed computing environment. A user accesses at least one second application server via a first application server. The user is able to sign-out from all the application servers to which he is connected via the first application server by signing out of any one of the signed in application servers. The single sign out procedure ensures the user does not inadvertently remain signed into the application servers when the user does not explicitly sign out of each signed in application server.

13 Claims, 5 Drawing Sheets

METHOD AND APPARATUS FOR ACCESSING COMPUTERS IN A DISTRIBUTED COMPUTING ENVIRONMENT

CROSS-REFERENCE TO RELATED APPLICATIONS

This application is related to subject matter disclosed in commonly assigned U.S. patent application Ser. No. 10/323,585, filed on Dec. 19, 2002. The aforementioned related patent application is herein incorporated by reference.

BACKGROUND OF THE INVENTION

1. Field of the Invention

Embodiments of the present invention generally relate to securing a distributed computing environment and, more specifically, to a method and apparatus for accessing computers in the distributed computing environment.

2. Description of the Related Art

Computer security issues have become more complex with the continual evolution of contemporary computer systems. As corporations utilize increasingly distributed and open computing environments, the security requirements of an enterprise typically grow accordingly. The complexity of employee, customer and partner access to critical information assets, while assuring proper security, has proven to be a major hurdle. For example, many organizations deploy network applications that allow their external business partners, as well as their own internal employees, to access sensitive information resources within the enterprise. In the absence of adequate security measures, an enterprise may be subject to the risk of decreased security and confidentiality.

In today's complex business environment, specifying, stating, implementing and managing an enterprise access control policy may be both difficult and inefficient. When corporate data and applications revolved around a mainframe model, the problem of defining and managing access to corporate applications was relatively straightforward. Today, the complexity of distributed application architectures, may force companies to resort to manual, ineffective or highly custom approaches to access control in their attempts to implement security procedures.

A distributed computer system is usually secured by employing a combination of encryption, authentication, and authorization technologies. Encryption is a means of sending information between participants in a manner that prevents other parties from reading the information. Authentication is a process of verifying a party's identity. Authorization is a technique for determining what actions a participant is allowed to perform.

The security approach of most companies today is to focus on the authentication of users to ensure that those users are part of the organization or a member of a select group. Authentication can be accomplished with a number of different approaches, from simple password or challenge response mechanisms to smart cards and biometric devices such as a fingerprint reader. Once users are authenticated, however, there is still a significant problem in managing and enforcing their set of privileges, which may be unique and vary widely between users. The same authentication mechanism can be used for every user, but different authorization mechanisms must be developed for most applications. Therefore, reliable and efficient access control is a difficult problem facing enterprises today.

Authentication mechanisms often work together with some sort of access control facility that can protect information resources from unauthorized users. Examples of network security products include firewalls, digital certificates, virtual private networks, and single sign-on systems. Some of these products provide limited support for resource-level authorization. For example, a firewall can screen access requests to an application or a database, but does not provide object-level authorization within an application or database. Single Sign-On (SSO) products, for example, maintain a list of resources an authenticated user can access by managing the login process to many different applications.

A Single Sign-On application allows an end user to log into multiple applications with one set of credentials and simplifies password management for an enterprise. Single Sign-On applications allow a user to create a remote session and sign on and access resources located on a remote computer. However, there is a possibility the user will fail to sign out or logout of the remote computer upon terminating the remote session. Failure to sign out from the remote computer compromises security and increases the likelihood of unauthorized access to information stored on the remote computer.

Thus, there is a need in the art for a method and apparatus that ensures a user is signed out from each and every remote computer in a distributed computing environment to protect against unauthorized access to information stored on the computer.

SUMMARY OF THE INVENTION

The present invention is a method and apparatus for single sign-out from one or more application servers in a distributed computing environment. Within a single sign-on system, a user logs into a first application server, and is able to access at least one other application server (i.e., a second application server) via the first application server without performing an additional login. The user is able to sign-out from all the application servers to which the user is connected via the first application server by signing out of any one of the application servers. The single sign out procedure ensures the user does not inadvertently remain signed into other application servers without requiring the user to explicitly sign out of each logged in application server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method and apparatus for single sign-out from one or more application servers in a distributed computing environment. Single sign-out ensures the user does not inadvertently remain logged into one/many application servers without requiring the user to explicitly sign out of each logged in application server.

Figure 1:
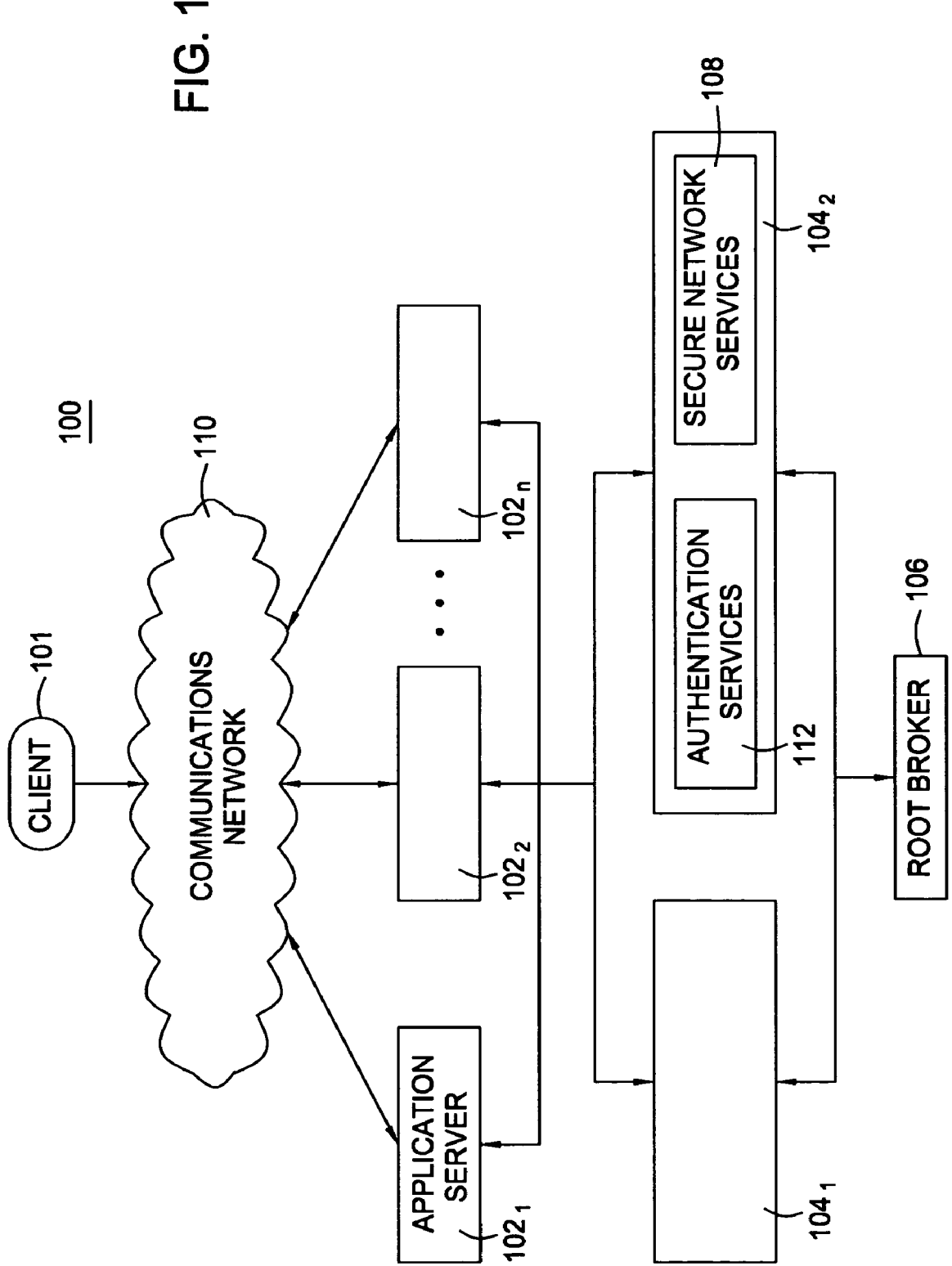
FIG. 1 is a block diagram of a distributed computing environment which utilizes one embodiment of the present invention.

FIG. 1 is a block diagram of a distributed computing environment 100 that utilizes one embodiment of the present invention. The distributed computing environment 100 comprises at least one client computer 101, application servers $102_1$ to $102_n$ (collectively referred to as application servers 102), a communications network 110, at least one backend server $104_1$, $104_2$ (collectively referred to as backend servers 104), and a root broker 106.

The at least one client computer 101 is coupled to the application servers 102 via the communications network 110. For simplicity, only one client 101 is shown, however multiple clients may connect to the application servers 102 via the communications network 110. The communications network 110 may be any conventional network, such as an Ethernet network or a fiber channel network, that provides either a direct or indirect (e.g., Internet or communication via a client) connection between the servers. The client computer 101 provides a user interface into the distributed computing environment. In one embodiment, the user interface is a graphical user interface (GUI) via a web browser.

The application servers 102 seamlessly provide applications to the user such as Internet, productivity software, collaboration software, databases, and electronic mail, etc., and function as a gateway to the backend servers 104. The application servers 102 allow a user to access multiple applications from the client computer 101. The backend servers 104 provide authentication services 112 to the application servers 102 and authenticate information submitted by the client computer 101. A "username" and "password" are examples of information that are authenticated by the backend server 104. The backend servers 104 may also provide secure network services 108 to the application servers 102. Such network services may also be provided by a separate server.

The authentication services 112 are authenticated by a root broker 106. The root broker 106 is the most trusted certification authority in the distributed computing environment 100. The root broker 106 registers the authentication services 112 and issues authentication broker credentials. Exemplary authentication services 112 may be provided by Veritas Security Server, available from Veritas Corporation of Mountain View, Calif.

Figure 2:
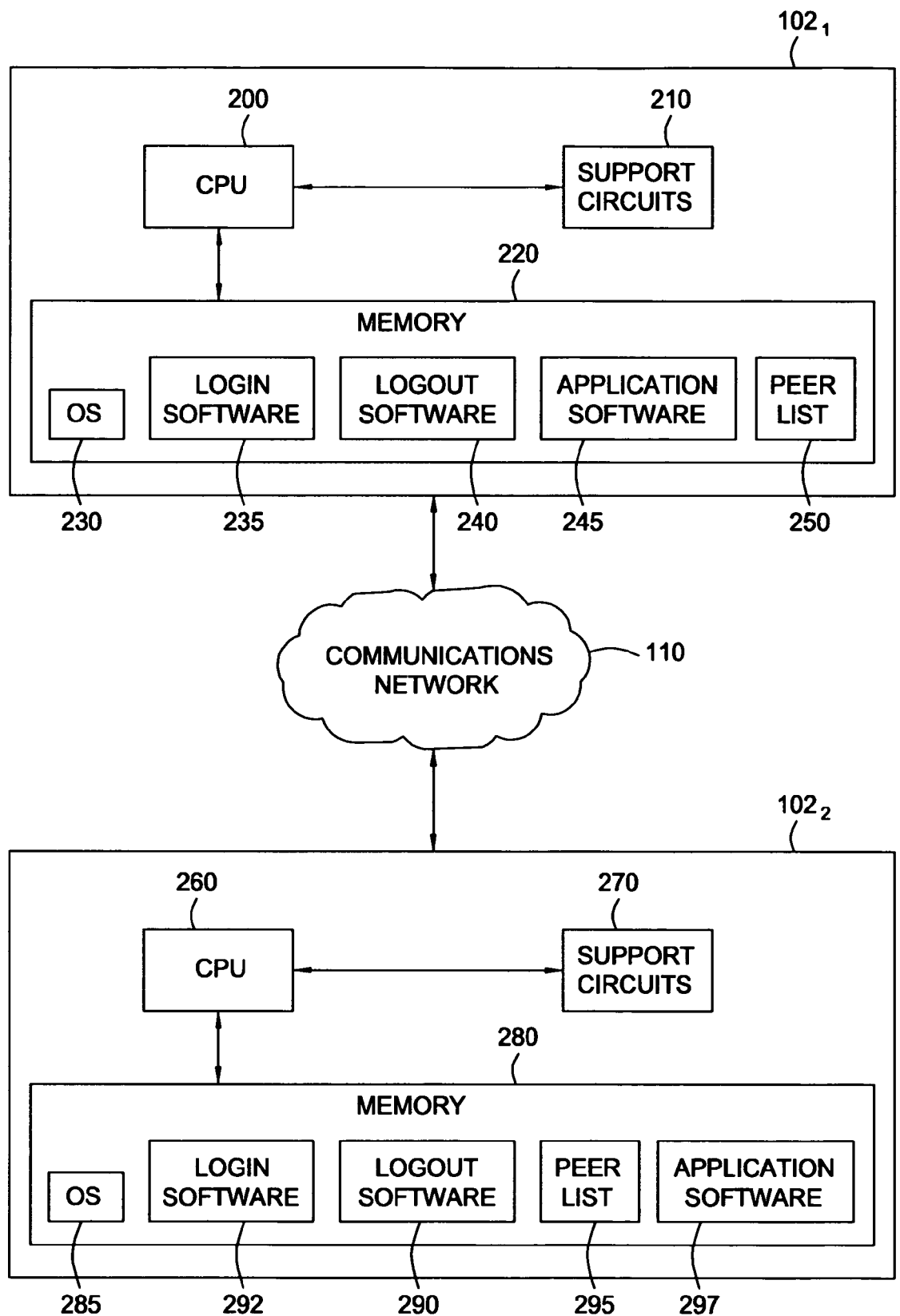
FIG. 2 is a block diagram of an application server.

FIG. 2 is a block diagram of a first application server $102_1$ communicating to one another, either directly or indirectly, through a network 110.

The servers $102_1$ and $102_2$ comprise at least one central processing unit (CPU) 200, support circuits 210, and memory 220/280. The CPU 200/260 may comprise one or more conventionally available microprocessors and/or microcontrollers. The support circuits 210/270 are well known circuits that are used to support the operation of the CPU 200/260. These circuits comprise power supplies, cloaks, input/output interface circuitry, cache and the like.

Memory 220/280 may comprise random access memory, read only memory, removable disk memory, disk arrays, flash memory, optical storage and various combinations of these types of memory. The memory 220/280 stores various forms of software and files, such as an operating system (OS) 230/285, application software 245/297, login software 235/292, logout software 240/290 and a peer list 250/295.

The application software 245/297 includes applications used by the user such as Internet, web server, productivity software, collaboration software, databases, and electronic mail.

The login software 235/292 enables a user to login to multiple application servers after being authenticated once by the application server $102_1/102_2$. The user can seamlessly navigate between application servers 102 without having to resubmit authentication information, i.e. a username and password, each time an application server 102 is accessed.

The logout software 240/290 enables a user to sign-out from each application server 102 the user accessed via the login software 235/292. The logout software 240/290 signs-out an application server 102 from each and every application server on the peer list 250/295. The logout software 240/290 ensures a user does not remain inadvertently logged into an application server 102 after signing-out from any one of the logged in application servers 102.

Figure 3:
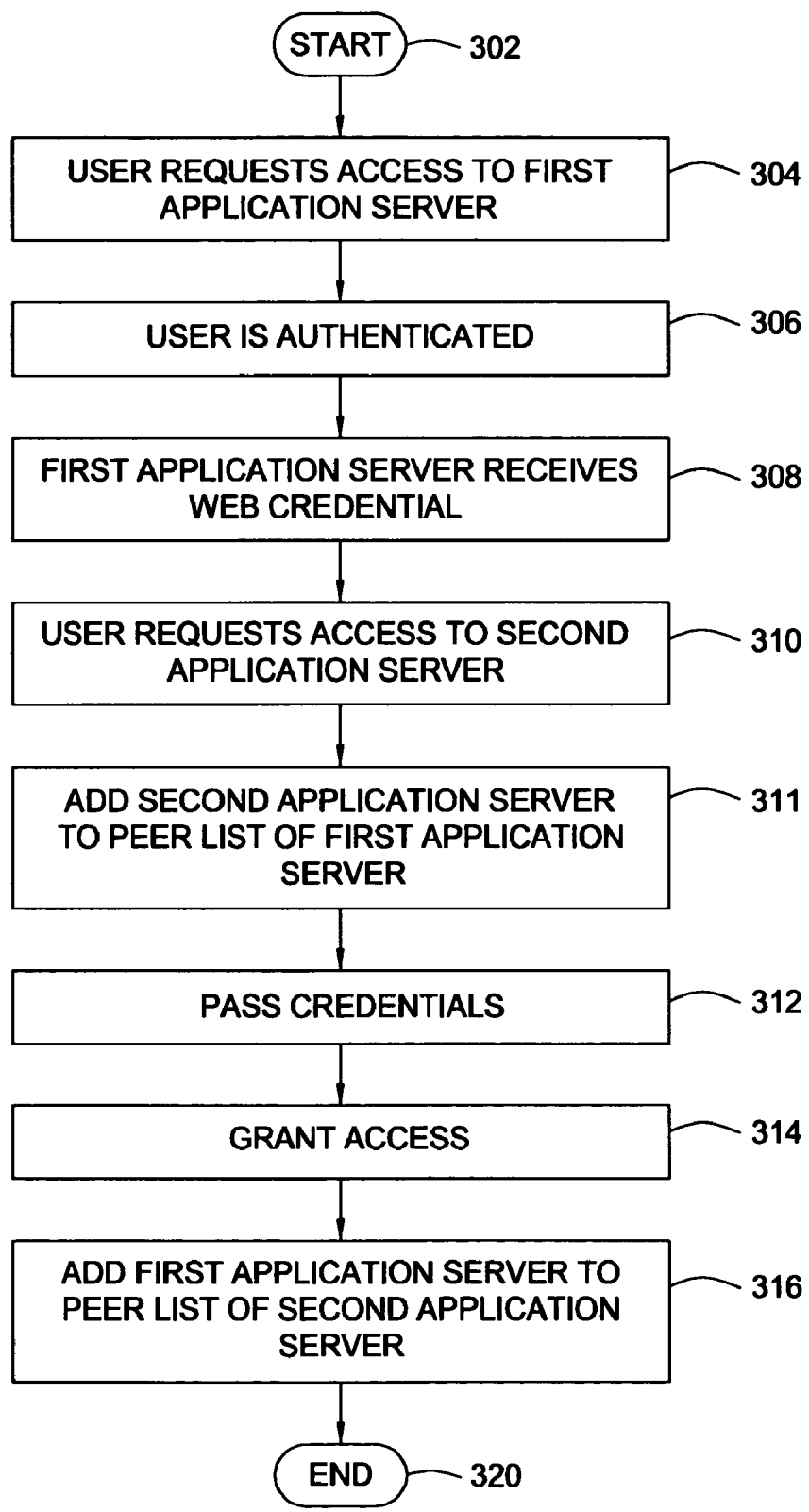
FIG. 3 is a flow diagram of a first method for Single Sign-On to a remote computer.

FIG. 3 is a flow diagram of a method 300 for Single Sign-On that utilizes the present invention. The method 300 starts at step 302 and proceeds to step 304. At step 304, a user requests access to a first application server $102_1$ via a client computer 101. Login software 235 within the first application server $102_1$ sends a "Login" page back to the user. The user enters authentication information into the client computer 101 and submits the information to the first application server $102_1$. At step 306, login software 235 facilitates authentication of the user by the first application server $102_1$. Authentication is accomplished by the first application server $102_1$ passing information submitted by the user, i.e. login name and password, to an authentication service $112_1$ residing at the backend server $104_1$. An exemplary method and apparatus for authenticating a user's credentials is disclosed in commonly assigned U.S. patent application titled "AUTHENTICATION BROKER", Ser. No. 10/323,585, filed on Dec. 19, 2002, which is incorporated by reference in its entirety. The backend server $104_1$ comprises authentication services 112 and secure network services 108.

At step 308, the authentication service $112_1$ passes a web credential back to the first application server $102_1$. The "web-credential" may be a cookie or a token. The first application server $102_1$ uses the web-credential to establish a secure connection with the secure network services 108 provided by the backend server $104_1$. At step 310, at some time during the session with the first application server, the user requests access to a second application server $102_2$ via the first application server $102_1$. This generally occurs when a user selects a link to a program that executes on the second application server. At step 311, the first application server $102_1$ adds the identity of the second application server $102_2$ to a peer list 250. At step 312, to avoid requiring the user to manually sign on to the second application server, the first application server $102_1$ passes its identity and the web credential to the second application server $102_2$ via the link. Login software 292 within the second application server $102_2$ extracts the web-credential and verifies its authenticity. Upon verification of the web-credential, the second application server $102_2$ establishes a secure connection with the secure network services 108 provided by the backend server $104_2$.

At step 314, the second application server $102_2$ grants access to the client computer 101 based upon the web credential. At step 316, the second application server $102_2$ adds the identity of the first application server $102_1$ to a peer list 295. The peer list 250 includes the identities of all the application servers 102 that the client computer has logged in via the first application server $102_1$ as well as the application servers 102 that the first application server $102_1$ has received connections from; the peer list 295 includes the identities of all the application servers 102 that the client computer has logged in via the second application server $102_2$ as well as the application servers 102 that the second application server $102_2$ has received connections from. The peer lists 250/295 enable the first application server $102_1$ and second application server $102_2$ to track the application servers 102 it has made a connection to or received a connection from, and also enable the application servers $102_1/102_2$ to sign-out from each and every of the connected application servers 102. The method ends at step 320.

The user has employed a single sign-in procedure to access the second application server $102_2$ via the first application server $102_1$. A single sign-out procedure is needed to ensure the user is able to properly sign out of all the application servers 102. In the absence of such a technique, the user may remain signed into the second application server $102_2$ upon signing out from the first application server $102_1$ and vice versa.

Figure 4:
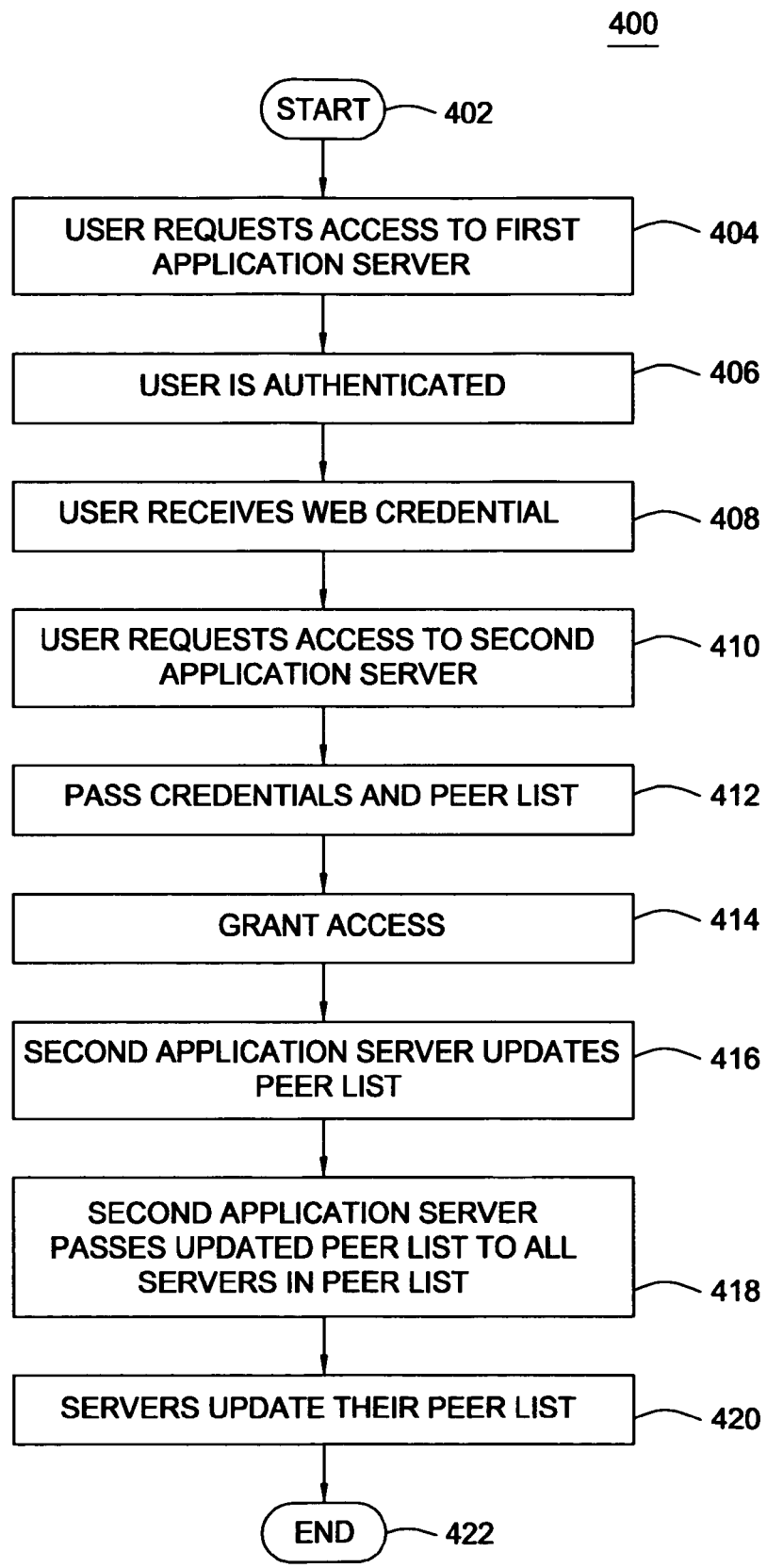
FIG. 4 is a flow diagram of a second method for Single Sign-On to a remote computer.

FIG. 4 is a flow diagram of another method 400 for single sign-In that utilizes the present invention. The method 400 starts at step 402 and proceeds to step 404. At step 404, a user requests access to a first application server $102_1$ via a client computer 101. At step 406, the user is authenticated by the first application server $102_1$. Authentication is accomplished by the first application server $102_1$ passing information submitted by the user, i.e. login name and password, to an authentication service $112_1$ residing in the backend server $104_1$. An exemplary method and apparatus for authenticating a user's credentials is disclosed in commonly assigned U.S. patent application titled "AUTHENTICATION BROKER", Ser. No. 10/323,585, filed on Dec. 19, 2002, which is incorporated by reference in its entirety. The backend server $104_1$ comprises authentication services 112 and secure network services 108.

At step 408, the authentication service $112_1$ passes a web credential back to the first application server $102_1$. At step 410, the user requests access to a second application server $102_2$ via the first application server $102_1$. The user requests access to the second application server $102_2$ by clicking on a URL address presented by the first application server $102_1$. At step 412, the first application server $102_1$ passes its peer list 250 and the web credential to a second application server $102_2$ via the URL link. At step 414, the second application server $102_2$ grants access to the client computer 101 based upon the web credential. At step 416, the second application server $102_2$ updates its peer list 295 with information obtained from the peer list 250 of the first application server $102_1$. At step 418, the second application server $102_2$ passes the updated peer list 295 back to each application server in the updated peer list. In one embodiment of the invention, application server $102_2$ sends back a page to the client computer 101 which invokes a JavaScript on the client computer 101.

The JavaScript migrates the updated peer list to each application server 102 in the peer list by asynchronously invoking a URL of the login software 235 of each application server 102 and passing the peer list via that link. In another embodiment of the invention, application server $102_2$ sends back a page to the client computer 101 that has one invisible inline HTML frame for each application server 102 in the updated peer list. Each inline frame migrates the updated peer list by invoking a URL of the login software 235 of the corresponding application server 102 and passing the peer list via the link. At step 420, each first application server $102_1$ updates its peer list 250 with information obtained from the peer list 295 of the second application server $102_2$. The peer list 250/295 enables the application servers 102 to know about all other application servers 102 that the client computer 101 is also logged into using Single Sign In. The peer list 250/295 enables a user to employ a single sign-out procedure from a specific application server 102 and sign out of all the application servers 102 to which the client computer 101 is connected. The method ends at step 422.

Figure 5:
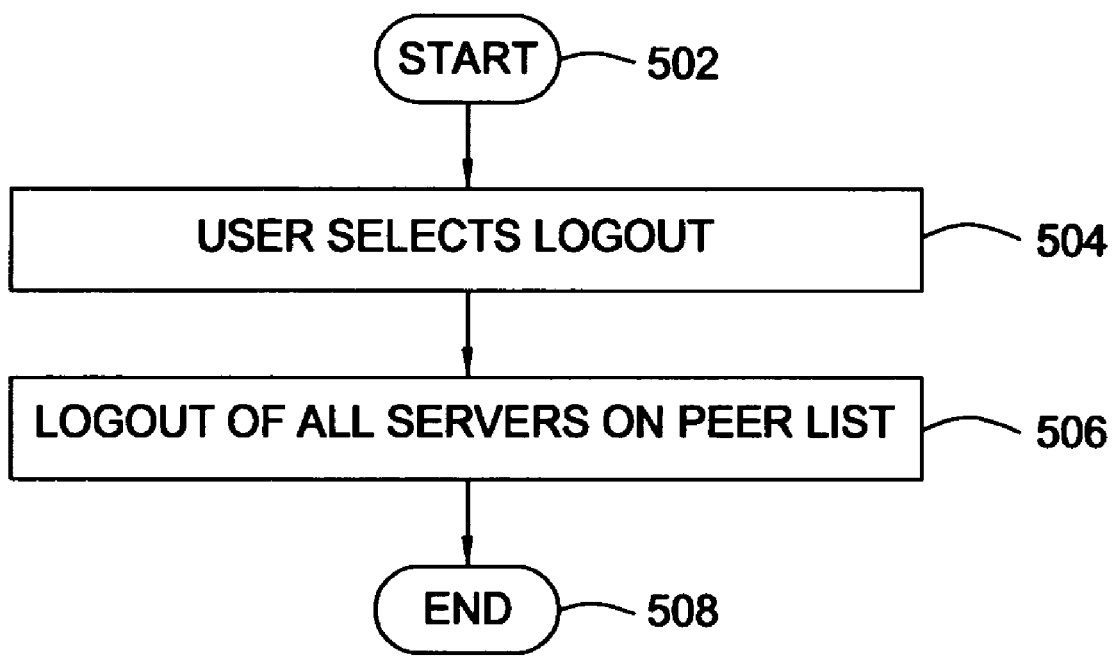
FIG. 5 is a flow diagram of a method for Single Sign-Out that utilizes an embodiment of the present invention.

FIG. 5 is a flow diagram of a method 500 for single sign-out from a distributed computing environment 100 that utilizes an embodiment of the present invention. The method 500 starts at step 502 and proceeds to step 504. At step 504, the user initiates a single sign-out by signing out from any of the application servers 102. Sign-out is accomplished by click on a URL address to activate logout software 240/290. At step 506, the logout software 240/290 signs-out the client computer 101 from each application server 102 present on the peer list 250/295 (shown in FIG. 2 as 250/295). The logout software 240/290 may be constructed in HTML, JavaScript or any appropriate programming language. In one embodiment of the invention, clicking on the URL address invokes a JavaScript on the client computer 101 that signs-out the client computer 101 from all of the application servers 102 that it's presently logged into. In one embodiment, this is generally performed in two steps: first, the client computer 101 is logged out of the current server via an Asynchronous Java Script and XML (AJAX) request or standard http request. The server then performs a self logout in response to the request. Next, The JavaScript computes the union of all the peer lists 250/295 and then performs logout from each application server 102 by asynchronously invoking a URL of the logout software 240/290 of each application server 102. In another embodiment of the invention, application server 102 sends back a page to the client computer 101 that has one invisible inline HTML frame for each application server 102 in the peer list. Each inline frame invokes a URL of the logout software 240/290 of the corresponding application server 102. The method ends at step 508.

The present invention provides the advantage of enabling a user to sign out of one or more application servers by signing out of only one application server. Single sign-out enhances security within a distributed computing environment and helps prevent unauthorized access to information on an application server from which the user has failed to sign out.

While the foregoing is directed to embodiments of the present invention, other and further embodiments of the invention may be devised without departing from the basic scope thereof, and the scope thereof is determined by the claims that follow.

The invention claimed is:

1. A method for single sign-out in a distributed computing environment accessing a computer network comprising:

accessing at least one second application server through a first application server;

updating a first peer list coupled to the first application server with a second identity of the at least one second application server, wherein the first peer list comprises first information identifying a first one or more application servers (i) that a user has signed in to via the first application server and (ii) from which the user has signed in to the first application server;

updating a second peer list coupled to the at least one second application server with a first identity of the first application server, wherein the first identity of the is passed from the first application server to the at least one second application server and wherein the second peer list comprises second information identifying a second one or more application servers (iii) that the user has signed in to via the second application server and (iv) from which the user has signed in to the second application server; and wherein the first and the second peer lists enable tracking of the first and the second one or more application servers that have been accessed in order to sign the user out of the first and the second one or more application servers during a single sign-out operation;

detecting a sign-out from any of the first or the at least one second application servers; and signing-out from the first application server and the at least one second application server identified on any of the first peer list and the second peer list.

2. The method of claim 1 further comprising:
authenticating the first application server via an authentication server;
obtaining a web credential from the authentication server; and
using the web credential to access the second application server.

3. The method of claim 1 further comprising:
detecting a sign-out from any of the first application server or the at least one second application server; and
signing-out from the first application server and the at least one second application server identified on any of the first peer list and the second peer list.

4. The method of claim 3 wherein signing-out is accomplished by at least one of a JavaScript or an in-line HTML frame.

5. The method of claim 1 further comprising:
migrating the first peer list to the second application server;
updating the second peer list with information obtained from the first peer list;
migrating the updated second peer list to the first application server in the updated second peer list; and
updating the first peer list with information obtained from the updated second peer list.

6. The method of claim 5 wherein the second peer list further comprises information identifying a plurality of application servers, each being coupled to a corresponding peer list in a plurality of peer lists; and where the updated second peer list is migrated to each of the plurality of application servers in the updated second peer list.

7. The method of claim 5 wherein migrating the updated second peer list is accomplished by at least one of a JavaScript or an in-line HTML frame.

8. The method of claim 1 wherein signing-out is accomplished by at least one of a JavaScript or an in-line HTML frame.

9. A method for performing single sign-out in a distributed computing environment comprising:

authenticating a first application server via an authentication server; obtaining a web credential from the authentication server;

using the web credential to access at least one second application server through the first application server;

updating a first peer list coupled to the first application server with a second identity of the at least one second application server, wherein the first peer list comprises a first at least one identity of each application server (i) a user has signed-in to via the first application server and from where the user has signed-in to the first application server;

updating a second peer list coupled to the at least one second application server with a first identity of the first application server, wherein the second peer list comprises a second at least one identity of each application server (iii) the user has signed-in to via the second application server and (iv) from where the user has signed-in to the second application server;

migrating the first peer list to the at least one second application server;

updating the second peer list with information obtained from the first peer list;

migrating the updated second peer list to each application server in the updated second peer list wherein migrating is accomplished by at least one of a JavaScript and an in-line HTML frame; and updating the first peer list with information obtained from the updated second peer list;

initiating a single sign-out operation;

determining, from the first and the second peer lists, the first and the second at least one identities signing-out, via the single sign-out operation, from the each application server identified by the first and the second at least one identities, wherein signing-out is accomplished by at least one of a JavaScript or an in-line HTML frame.

10. An apparatus comprising:
a first application server, wherein the first application server is coupled to a first peer list;
at least one second application server, wherein the at least one second application server is coupled to a second peer list;
means for accessing the at least one second application server through the first application server;
means for updating the first peer list with a second identity of the at least one second application server;
means for updating the second peer list with a first identity of the first application server, wherein the first peer list comprises first information identifying a first one or more application servers (i) that a user has signed in to via the first application server and (ii) from which the user has signed in to the first application server; and wherein the second peer list comprises second information identifying a second one or more application servers (iii) that the user has signed in to via the second application server and (iv) from which the user has signed in to the second application server; and wherein the first and the second peer lists enable tracking of the first and the second one or more application servers that have been accessed in order to sign the user out of the first and the second one or more application servers during a single sign-out operation;
means for detecting a sign-out from any of the first application server or the at least one second application server; and means for signing-out from the first application server and the at least one second application server identified on any of the first peer list and the second peer list.

11. The apparatus of claim 10 further comprising:
means for authenticating the first application server via an authentication service;
means for obtaining a web credential from the authentication service;
and means for using the web credential to access the at least one second application server.

12. The apparatus of claim 11 further comprising:
means for migrating the first peer list to the at least one second application server;
means for updating the second peer list with information obtained from the first peer list;
means for migrating the updated second peer list to each of at least one application server in the updated second peer list; and
means for updating each peer list coupled to the at least one application server with information obtained from the updated second peer list.

13. The apparatus of claim 12 further comprising:
means for detecting a sign-out from any of the first application server or the at least one second application server; and
means for signing-out from the first application server and the at least one second application server identified on any of the first peer list and the second peer list.

* * * * *